(12) United States Patent
Kollarapu et al.

(10) Patent No.: US 12,481,493 B2
(45) Date of Patent: Nov. 25, 2025

(54) MANAGING OUT OF BAND SOFTWARE UPDATES

(71) Applicant: Dell Products L.P., Round Rock, TX (US)

(72) Inventors: Rajaravi Chandra Kollarapu, Allen, TX (US); Vinodkumar Vasudev Ottar, Mckinney, TX (US); Adolfo Sandor Montero, Pflugerville, TX (US); Richard M. Tonry, Georgetown, TX (US); Abeye Teshome, Austin, TX (US); Luis Antonio Valencia Reyes, Waxahachie, TX (US); Bassem El-Azzami, Austin, TX (US); Mohit Arora, Frisco, TX (US)

(73) Assignee: Dell Products L.P., Round Rock, TX (US)

( * ) Notice: Subject to any disclaimer, the term of this patent is extended or adjusted under 35 U.S.C. 154(b) by 206 days.

(21) Appl. No.: 18/425,223

(22) Filed: Jan. 29, 2024

(65) Prior Publication Data
US 2025/0244986 A1   Jul. 31, 2025

(51) Int. Cl.
    *G06F 8/65*   (2018.01)
(52) U.S. Cl.
    CPC ..................... *G06F 8/65* (2013.01)
(58) Field of Classification Search
    CPC .................. G06F 8/60; G06F 8/61; G06F 8/65
    See application file for complete search history.

(56) References Cited

U.S. PATENT DOCUMENTS

| | | |
|---|---|---|
| 8,042,182 B2 | 10/2011 | Milani Comparetti et al. |
| 8,474,016 B2 | 6/2013 | Charley |
| 8,615,785 B2 | 12/2013 | Elrod et al. |
| 8,924,620 B2 | 12/2014 | Harriman et al. |
| 9,215,244 B2 | 12/2015 | Ayyagari et al. |
| 9,529,602 B1 | 12/2016 | Swierk |
| 9,734,169 B2 | 8/2017 | Redlich et al. |
| 10,176,308 B2 | 1/2019 | Mintz et al. |
| 10,298,670 B2 | 5/2019 | Ben-Shaul et al. |
| 10,671,765 B2 | 6/2020 | Swierk et al. |
| 11,036,902 B2 | 6/2021 | Nicholas |

(Continued)

FOREIGN PATENT DOCUMENTS

WO   2024102715 A1   5/2024

*Primary Examiner* — Marina Lee
(74) *Attorney, Agent, or Firm* — WOMBLE BOND DICKINSON (US) LLP

(57) ABSTRACT

Methods and systems for updating a data processing system are disclosed. To update the data processing system, an out of band communication channel may be used by a management controller of the data processing system to: obtain a command, and based on the command, obtain an update package from a remote entity for updating the data processing system. The management controller may store the update package in a partition using local side band communication channels. After the update package is stored, the management controller may initiate a restart of the data processing system. During the restart, if the update package is determined to be in the partition, a startup management entity may use the update package to update operation of a component to obtain an updated component. After completion of the restart, the updated component may be used to provide desired computer implemented services.

20 Claims, 7 Drawing Sheets

(56) References Cited

U.S. PATENT DOCUMENTS

| | | |
|---|---|---|
| 11,102,122 B2 | 8/2021 | Seed et al. |
| 11,134,380 B2 | 9/2021 | Fox et al. |
| 11,487,274 B2 | 11/2022 | Valder et al. |
| 11,792,267 B2 | 10/2023 | Kreiner et al. |
| 12,306,708 B2 * | 5/2025 | Thiruchengode Vajravel ............ G06F 11/0778 |
| 2011/0087387 A1 | 4/2011 | Safa-Bakhsh et al. |
| 2012/0266259 A1 | 10/2012 | Lewis |
| 2013/0019239 A1 | 1/2013 | Fontignie |
| 2014/0101653 A1 * | 4/2014 | Dharmadhikari ......... G06F 8/65 717/173 |
| 2014/0208133 A1 * | 7/2014 | Gopal ................ G06F 11/2294 713/310 |
| 2014/0304497 A1 | 10/2014 | Park |
| 2017/0357515 A1 | 12/2017 | Bower, III |
| 2018/0039946 A1 | 2/2018 | Bolte et al. |
| 2018/0082065 A1 | 3/2018 | Liu |
| 2018/0137284 A1 | 5/2018 | Oh |
| 2019/0384917 A1 | 12/2019 | Shah |
| 2021/0034048 A1 | 2/2021 | Hajizadeh |
| 2021/0073211 A1 | 3/2021 | Wright, Sr. |
| 2021/0397716 A1 | 12/2021 | Kovah |
| 2022/0038659 A1 | 2/2022 | Michel |
| 2023/0246827 A1 | 8/2023 | Luciani, Jr. |
| 2023/0325535 A1 | 10/2023 | Sharma |
| 2023/0342446 A1 | 10/2023 | Reddy |
| 2024/0070329 A1 | 2/2024 | York |

* cited by examiner

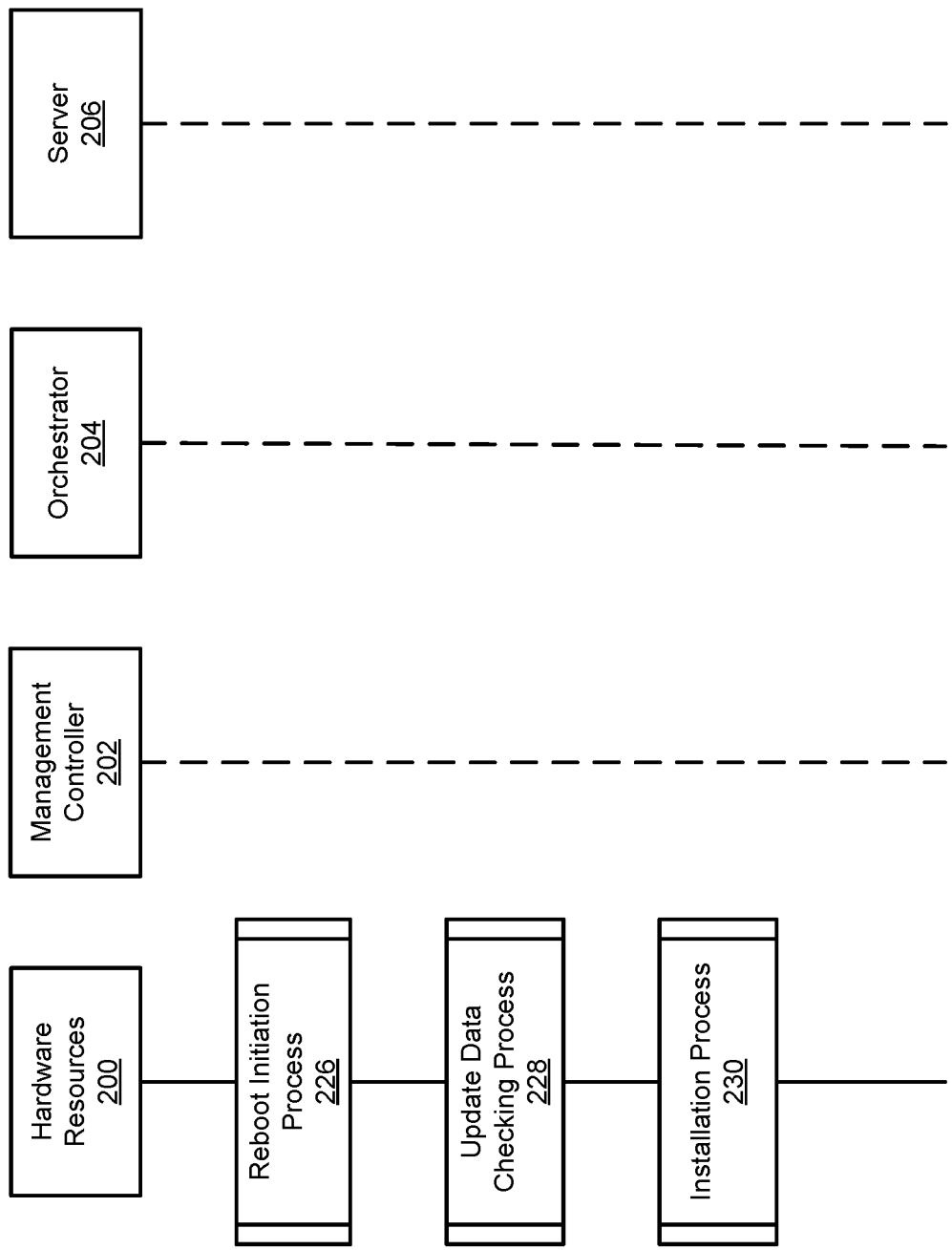

MANAGING OUT OF BAND SOFTWARE UPDATES

FIELD

Embodiments disclosed herein relate generally to managing updates of data processing systems. More particularly, embodiments disclosed herein relate to systems and methods to manage updates for a data processing system of the data processing systems using out of band methods.

BACKGROUND

Computing devices may provide computer implemented services. The computer implemented services may be used by users of the computing devices and/or devices operably connected to the computing devices. The computer implemented services may be performed with hardware components such as processors, memory modules, storage devices, and communication devices. The operation of these components and the components of other devices may impact the performance of the computer implemented services.

BRIEF DESCRIPTION OF THE DRAWINGS

Embodiments disclosed herein are illustrated by way of example and not limitation in the figures of the accompanying drawings in which like references indicate similar elements.

FIGS. 2A-2C show interaction diagrams in accordance with an embodiment.

DETAILED DESCRIPTION

Figure 1A:
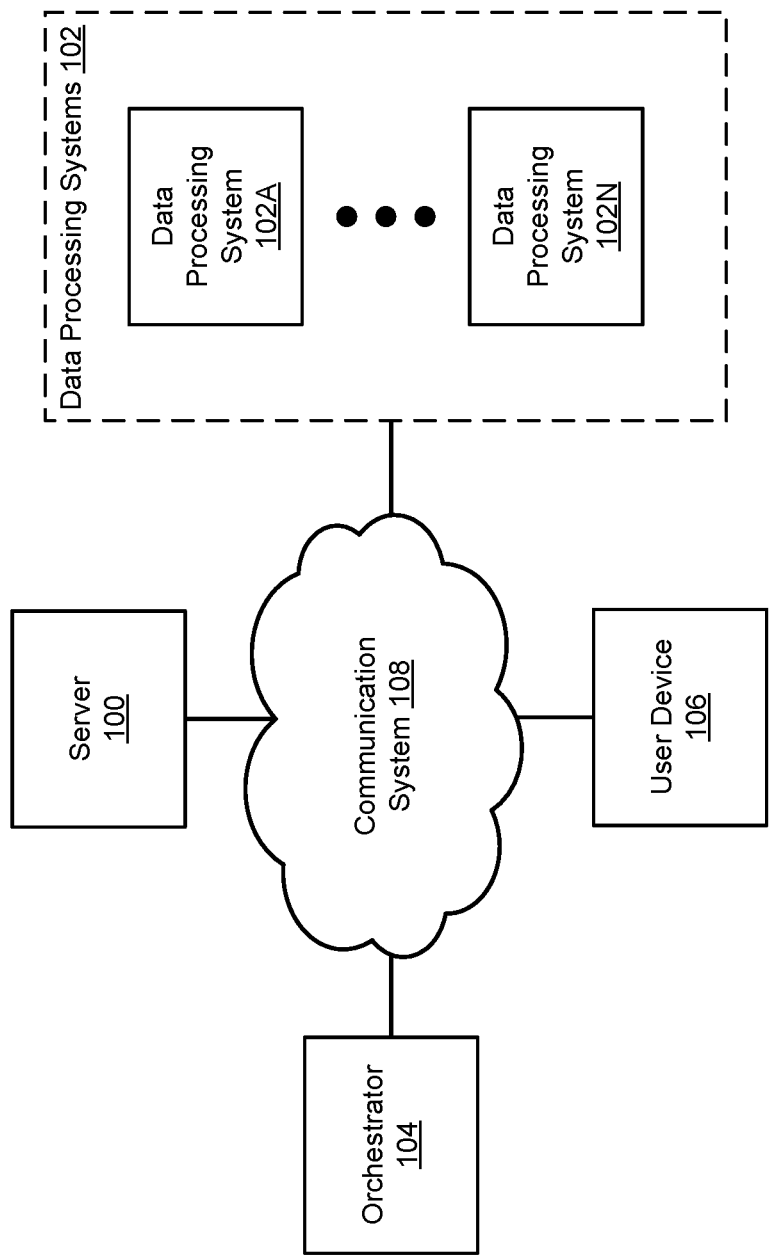
FIG. 1A shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing out of band software updates of data processing systems that may provide, at least in part, computer implemented services. The computer implemented services may be provided to any type and/or number of other devices and/or users of the data processing systems. Furthermore, the provided computer implemented services may be of any quantity and/or type of such services.

To provide the computer implemented services, a distributed system may include any number of data processing systems that may each include any quantity of hardware resources. These hardware resources may include in-band hardware components (e.g., processors, memory modules, storage devices, communications devices, and/or other hardware components that depend on transmissions via in-band communication channels) whose respective operations may facilitate various functionalities of a data processing system, thereby causing the computer implemented services to be provided by the data processing system.

A quantity and/or a type of the provided computer implemented services may depend on functionalities facilitated by a specific operation. For example, operation of at least a portion of the hardware resources may support execution of applications (e.g., software components) hosted by the data processing system, a type and/or a quantity of the applications being based on the operation.

Over time, the desired functionality to be provided by the data processing system may change. To change the type and/or the quantity of the computer implemented services provided by the data processing system, the operation of the data processing system may be updated. By updating the operation, different functionalities may be facilitated, thereby causing a different type and/or a different quantity of the computer implemented services to be provided.

To update the operation (and therefore, update the data processing system), various data structures may be used (e.g., executable computer code included in software installation packages, patches, etc.). However, if data from the data structures is unavailable, then the operation of the data processing system may not be updated. For example, various types of malwares and/or other threats may limit the ability of types of data structures to be retrieved from remote sources.

To increase a likelihood of an update being made successfully to the operation of the data processing system, an out of band communication channel may be used to leverage a management controller of the data processing system, rather than the in-band communication channels mentioned above. The out of band communication channel may be a dedicated communication channel for the management controller and may facilitate communication that is: (i) between the management controller and other devices connected to the distributed system and (ii) independent from in-band communications between the hardware resources and the network module.

By using the out of band communication channel, an update package (e.g., compiled portions of executable computer code that when executed may update the operation) may be made available to the data processing system via connection to the distributed system without the various types of malwares and/or the other threats limiting the ability of types of data structures to be retrieved from remote sources (e.g., connected to the distributed system).

Based on the update becoming available across the distributed system, a remote source such as a server connected to the distributed system used as a repository for update packages and/or other relevant information may cause a request to be provided to the management controller to update the operation of the data processing system.

Thus, an update package may be made available to the data processing system by connecting to the distributed system via the out of band communication channel. For example, once the update is made available, the management controller may obtain a request to perform the update for the data processing system.

Based on the request, the management controller may (i) obtain the update package from the remote source, (ii) store the update package in a dedicate partition limited to use during a restart (and/or other boot process) of the data processing system, and (iii) initiating the restart during which the update package may be used to perform the update for the data processing system.

By using the out of band communication channel and dedicated partition, the management controller may manage updates of the data processing system such that the likelihood of the update being performed successfully is increased.

In an embodiment, a method of updating a data processing system of a distributed system is provided.

The method may include: obtaining, by a management controller of the data processing system, a command to update the data processing system from an orchestrator of the distributed system; obtaining, by the data processing system and based on the command, an update package for updating the data processing system, the update package being obtained from a remote entity of the distributed system; storing, by the management controller, the update package in a partition hosted by a storage device of hardware resources of the data processing system; initiating, by the management controller and after the update package is stored in the partition, a restart of the data processing system; and during the restart: making, by a startup management entity hosted by the hardware resources, a determination regarding whether any update package is stored in the partition; in a first instance of the determination where the update package is stored in the partition: updating, by the startup management entity, operation of at least one component hosted by the hardware resources using the update package to obtain an updated at least one component; and providing, by the hardware resources and after completion of the restart, desired computer implemented services using the updated at least one component.

The method may also include: in a second instance of the determination where no update package is in the partition: completing, by the startup management entity, the restart; and providing, by the hardware resources, other computer implemented services not using the at least one component.

The command may indicate that the management controller is to install the update package.

The update package may include executable computer code that when executed updates the at least one component to obtain the updated at least one component.

The partition may include a portion of storage resources of the hardware resources.

Storing the update package may include sending, over a side band communication channel and by the management controller, the update package to at least one storage device of the storage resources that supports the partition.

Initiating the restart may include sending, by the management controller and via a side band communication channel, a request to perform the restart.

The data processing system may include a network module adapted to separately advertise network endpoints for the management controller and the hardware resources, the network endpoints being usable by the storage resources to address communications to the hardware resources and the management controller.

The management controller and the network module may be on separate power domains from the hardware resources so that the management controller and the network module are operable while the hardware resources are inoperable.

An out of band communication channel may run through the network module, and an in-band communication channel that services the hardware resources may also run through the network module.

The management controller may host a transmission control protocol/internet protocol (TCP/IP) stack to facilitate network communications via the out of band communication channel.

In an embodiment, a non-transitory media is provided. The non-transitory media may include instructions that when executed by a processor cause the computer implemented method to be performed.

In an embodiment, a data processing system is provided. The data processing system may include the non-transitory media and a processor and may perform the method when the computer instructions are executed by the processor.

Turning to FIG. 1A, a block diagram illustrating a system in accordance with an embodiment is shown. The system shown in FIG. 1A may be a distributed system that provides for update management of data processing systems that may provide, at least in part, computer implemented services.

The computer implemented services may include any type and quantity of computer implemented services. The computer implemented services may include, for example, database services, data processing services, electronic communication services, and/or any other services that may be provided using one or more computing devices. The computer implemented services may be provided by, for example, server 100, data processing systems 102, orchestrator 104, user device 106 and/or any other type of devices (not shown in FIG. 1A).

Other types of computer implemented services may be provided by the system shown in FIG. 1A without departing from embodiments disclosed herein.

To provide the computer implemented services, the system may include any number of data processing systems 102 (e.g., computing devices) that may each include any quantity of hardware resources. These hardware resources may include in-band hardware components (e.g., processors, memory modules, storage devices, communications devices) whose respective operations may facilitate various functionalities of data processing systems 102, thereby causing the computer implemented services to be provided.

Furthermore, a type and/or a quantity of the computer implemented services may depend on functionalities facilitated by a specific operation. For example, operation of a hardware component may support execution of applications (e.g., software components) hosted by data processing system 102A, a type and/or a quantity of the applications being based on the operation.

Over time, the desired functionality to be provided by a data processing system may change. To change the type and/or the quantity of the computer implemented services provided by the data processing system, the operation of the data processing system may be updated. By updating the operation, different functionalities may be facilitated, thereby causing a different type and/or quantity of the computer implemented services to be provided.

To update the data processing system, various data structures may be used (e.g., software installation packages, patches, etc.). However, if data from the data structures is unavailable, then the operation of the data processing system may not be updated. For example, various types of malwares and/or other threats may limit the ability of types of data structures to be retrieved from remote sources.

In general, embodiments disclosed herein relate to systems, devices, and methods for improving the likelihood of updates being made successfully to the operation of data processing systems. To do so, a management controller of a data processing system (e.g., 102A) may be leveraged.

The management controller may (i) obtain a request to perform an update for the data processing system, (ii) obtain an update package based on the request, (iii) store the update package in a dedicated partition used by the data processing system during a boot process, and (iv) initiate a restart and/or otherwise cause the boot process to be performed.

To obtain the request and/or update package, hardware resources of the data processing system may be used to communicate with other devices in a network (e.g., via in-band communication channels). Consequently, should the hardware resources be compromised in some way (e.g., impacted by malware, operate based on corrupted data, lacking network connectivity, and/or otherwise be unable to facilitate communications) a likelihood of the update being performed may be limited.

To increase the likelihood of performing the update, an out of band communication channel between the management controller and a network module may be used to obtain the request and/or the update package The out of band communication channel may be a dedicated communication channel for the management controller and may facilitate communication that is: (i) between the management controller and the other devices in the network (e.g., orchestrator 104) and (ii) independent from in-band communications between the hardware resources and the network module. To do so, the network module may advertise to the devices: (i) a first network endpoint for communication with the management controller using the out of band communication channel, and (ii) a second network endpoint for communication with at least a portion of the hardware resources using at least one in-band communication channel. For example, a source (e.g., orchestrator 104 and/or server 100) of the request and/or update package may specify an intended recipient by providing a network endpoint of the intended recipient to the network module.

For example, the network module may obtain the request and/or update package from orchestrator 104, the request specifying an intended recipient corresponding with the first network endpoint. Based on the first network endpoint, the network module may identify the management controller as the intended recipient of the request and/or update package before forwarding the request and/or update package to the management controller.

By obtaining the request, the management controller may instantiate acquisition of (e.g., the obtaining of) the update package based on the request. This acquisition may be performed, at least partially, as discussed above.

Once obtained by the management controller, the update package may be stored in the dedicated partition that is hosted by a storage device of the hardware resources, previously mentioned. To do so, a side band communication channel may facilitate communication between the hardware resources and the management controller. For example, a hard drive may be a hardware component of the hardware resources. The hard drive may have a range of physical addresses through which various data is stored. At least a portion of these physical addresses may be dedicated for use during the boot process, the at least a portion of these physical addresses may thereby be the dedicated partition.

Once the update package is stored in the dedicated partition, the management controller may, for example, initiate a restart of the data processing system. To do so, the management controller may use the side band communication channels to provide the hardware resources with a command to initiate the restart.

For example, the management controller may provide a request to a processor of the data processing system, the processor being another hardware resource of the hardware resources. Based on the request, the processor may hand off management of the data processing system to a startup management entity hosted by the hardware resources. For example, the startup management entity may be implemented with a basic input-output system (BIOS) of the data processing system, the BIOS facilitating crucial (and/or less than crucial) updates for the data processing system during boot processes.

This startup management entity may make a determination regarding whether the update package is stored in the dedicated partition. If determined that the update package is stored in the dedicated partition, the startup management entity may (i) determine where the update package is stored in the dedicated partition, (ii) update operation of at least one component (e.g., a graphics processing unit (GPU), a WiFi network card, peripherals such as a keyboard and/or mouse, and/or any other component usable to provide, at least in part, the computer implemented services) hosted by the hardware resources using the update package to obtain an updated at least one component (and thereby updating the data processing system), and (iii) completing the restart.

After the completion of the restart, updated operation of the hardware resources may allow for the computer implemented services to be provided as intended by a developer of the update package.

Figure 1B:
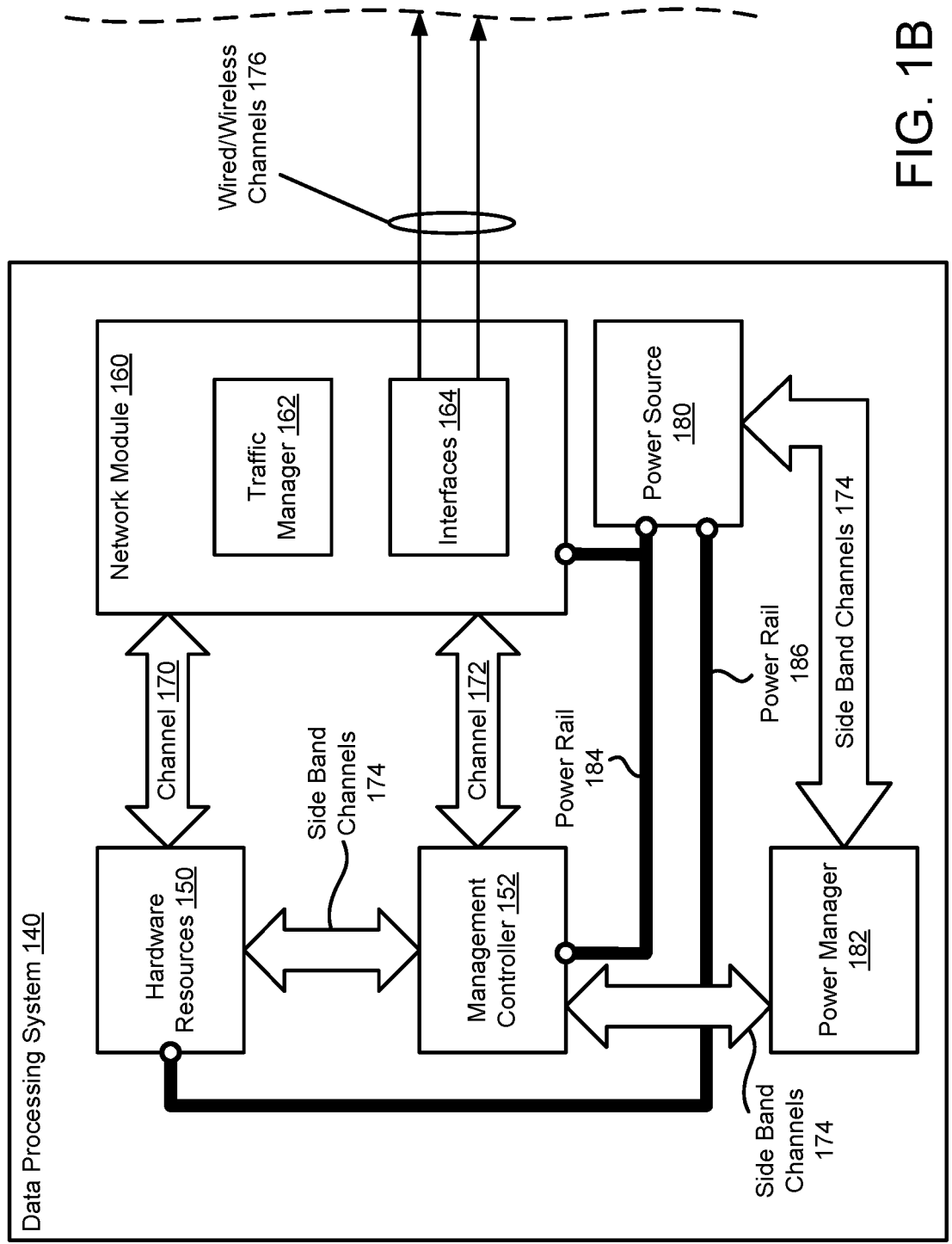
FIG. 1B shows a block diagram illustrating a data processing system in accordance with an embodiment.

By using the out of band communication channel and dedicated partition, the management controller may manage updates of the data processing system such that the likelihood of the update being performed is increased. Refer to FIG. 1B for additional details regarding the management controller.

User device 106 may be, for example, a device used by a developer and/or other entity that facilitates making any number of updates (and/or relevant update information) available through the distributed system. For example, user device 106 may be a laptop computer (e.g., and/or otherwise be a data processing system such as data processing systems 102A and/or 102B). The developer may obtain executable computer code, discussed further below, compile the executable computer code, and then deploy the executable computer code to, for example, server 100. Additionally, user device 106 may provide information regarding which updates to apply to the data processing systems 102 to orchestrator 104, discussed further below.

Server 100 may be implemented using a physical device that stores and manages device information related to data processing systems 102 (e.g., update data). The device information may include, for example, various updates made available (e.g., by deployment of the updates from user device 106) to data processing systems 102 over time. Additionally, for example, the device information may further include various versions of these updates, the device information indicating which versions of each of the updates has been used to update data processing systems 102.

For example, server 100 may be a manufacturer of data processing systems 102, a warranty provider for data processing systems 102, an end-of-life management service for data processing systems 102, a deployment manager to deploy updates for data processing updates and/or other entities.

Orchestrator 104 may manage a group of data processing systems (e.g., 102) by managing, for example, out of band software updates for at least one data processing system from the group. For example, orchestrator 104 may facilitate transmission of information usable to communicate with management controllers of the data processing systems based on instructions provided by user device 106 and/or update packages provided by server 100. For example, if user device 106 specifies when a specific update should be performed (e.g., implemented), regardless of when and/or where information regarding the update is published and/or otherwise made accessible to the management controllers, orchestrator 104 may only initiate performance of the update as specified by user device 106.

Any of the components illustrated in FIG. 1A may be operably connected to each other (and/or components not illustrated) with communication system 108.

Communication system 108 may include one or more networks that facilitate communication between any number of components. The networks may include wired networks and/or wireless networks (e.g., and/or the Internet). The networks may operate in accordance with any number and types of communication protocols (e.g., such as the internet protocol).

Communication system 108 may be implemented with one or more local communications links (e.g., a bus interconnecting a processor of any of data processing systems 102 server 100, and orchestrator 104).

Communication system 108 may include out of band communication channels, in-band communication channels, and/or other types of communication channels.

Refer to FIG. 1B for additional details regarding the management controller, network module, out of band communication channel, and/or hardware resources of data processing systems 102.

Turning to FIG. 1B, a diagram illustrating data processing system 140 in accordance with an embodiment is shown. Data processing system 140 may be similar to any of data processing systems 102 shown in FIG. 1A.

To provide computer implemented services, data processing system 140 may include any quantity of hardware resources 150. Hardware resources 150 may be in-band hardware components, and may include a processor operably coupled to memory, storage, and/or other hardware components.

The processor may host various management entities such as operating systems, drivers, network stacks, and/or other software entities that provide various management functionalities. For example, an operating system and drivers may provide abstracted access to various hardware resources. Likewise, a network stack may facilitate packaging, transmission, routing, and/or other functions with respect to exchanging data with other devices.

For example, the network stack may support transmission control protocol/internet protocol communication (TCP/IP) (e.g., the Internet protocol suite) thereby allowing hardware resources 150 to communicate with other devices via packet switched networks and/or other types of communication networks.

The processor may also host various applications that provide the computer implemented services. The applications may utilize various services provided by the management entities and use (at least indirectly) the network stack to communicate with other entities.

However, use of the network stack and the services provided by the management entities may place the applications at risk of indirect compromise. For example, if any of these entities trusted by the applications are compromised, these entities may subsequently compromise the operation of the applications. For example, if various drivers and/or communication stack are compromised, communications to/from other devices may be compromised. If the applications trust these communications, then the applications may also be compromised.

For example, to communicate with other entities, an application may generate and send communications to a network stack and/or driver, which may subsequently transmit a packaged form of the communication via channel 170 to a communication component, which may then send the packaged communication (in a yet further packaged form, in some embodiments, with various layers of encapsulation being added depending on the network environment outside of data processing system 140) to another device via any number of intermediate networks (e.g., via wired/wireless channels 176 that are part of the networks).

In addition, different configurations of hardware resources 150 and/or software resources may be implemented by data processing system 140 based on the type of computer implemented services that are to be provided. Modifications to configurations of hardware resources 150 and/or the software resources may lead to downtime for data processing system 140 and may consume network bandwidth of channel 170.

To reduce the downtime of data processing system 140 and to reduce the likelihood of the applications and/or other in-band entities from being indirectly compromised, data processing system 140 may include management controller 152 and network module 160. Each of these components of data processing system 140 is discussed below.

Management controller 152 may be implemented, for example, using a system on a chip or other type of independently operating computing device (e.g., independent from the in-band components, such as hardware resources 150 of a host data processing system 140). Management controller 152 may provide various management functionalities for data processing system 140. For example, management controller 152 may monitor various ongoing processes performed by the in-band component, may manage power distribution, thermal management, and/or other functions of data processing system 140.

To do so, management controller 152 may be operably connected to various components via side band channels 174 (in FIG. 1B, a limited number of side band channels are included for illustrative purposes, it will be appreciated that management controller 152 may communication with other components via any number of side band channels). The side band channels may be implemented using separate physical channels, and/or with a logical channel overlay over existing physical channels (e.g., logical division of in-band channels). The side band channels may allow management controller 152 to interface with other components and implement various management functionalities such as, for example, general data retrieval (e.g., to snoop ongoing processes), telemetry data retrieval (e.g., to identify a health condition/other state of another component), function activation (e.g., sending instructions that cause the receiving component to perform various actions such as displaying data, adding data to memory, causing various processes to be performed), and/or other types of management functionalities.

For example, to reduce the likelihood of indirect compromise of an application hosted by hardware resources 150, management controller 152 may enable information from other devices to be provided to the application without traversing the network stack and/or management entities of hardware resources 150. To do so, the other devices may direct communications including the information to management controller 152. Management controller 152 may then, for example, send the information via side band channels 174 to hardware resources 150 (e.g., to store it in a memory location accessible by the application, such as a shared memory location, a mailbox architecture, or other type of memory-based communication system) to provide it to the application. Thus, the application may receive and act on the information without the information passing through potentially compromised entities. Consequently, the information may be less likely to also be compromised, thereby reducing the possibility of the application becoming indirectly compromised. Similar processes may be used to facilitate outbound communications from the applications.

Management controller 152 may be operably connected to communication components of data processing system 140 via separate channels (e.g., 172) from the in-band components and may implement or otherwise utilize a distinct and independent network stack (e.g., TCP/IP). Consequently, management controller 152 may communicate with other devices independently of any of the in-band components (e.g., does not rely on any hosted software, hardware components, etc.). Accordingly, compromise of any of hardware resources 150 and hosted component may not result in indirect compromise of any management controller 152, and entities hosted by management controller 152.

To facilitate communication with other devices, data processing system 140 may include network module 160. Network module 160 may provide communication services for in-band components and out of band components (e.g., management controller 152) of data processing system. Specifically, an out of band communication channel (e.g., 172) that services management controller 152 and an in-band communication channel (e.g., 170) that services hardware resources 150 may run through network module 160. Network module 160 may host a TCP/IP stack to facilitate network communications via the out of band communication channel. To do so, network module 160 may include traffic manager 162 and interfaces 164.

Traffic manager 162 may include functionality to (i) discriminate traffic directed to various network endpoints advertised by data processing system 140, and (ii) forward the traffic to/from the entities associated with the different network endpoints. For example, to facilitate communications with other devices, network module 160 may advertise different network endpoints (e.g., different media access control address/internet protocol addresses) for the in-band components and out of band components. Thus, other entities may address communications to these different network endpoints. When such communications are received by network module 160, traffic manager 162 may discriminate and direct the communications accordingly (e.g., over channel 170 or channel 172, in the example shown in FIG. 1B, it will be appreciated that network module 160 may discriminate traffic directed to any number of data units and direct it accordingly over any number of channels).

Accordingly, traffic directed to management controller 152 may never flow through any of the in-band components. Likewise, outbound traffic from the out of band component may never flow through the in-band components.

Specifically, network module 160 may separately advertise network endpoints for management controller 152 and hardware resources 150. The network endpoints may be usable by entities throughout a distributed system (e.g., a domain) to which data processing system 140 is a part (e.g., connected to) to address communications to hardware resources 150 using the in-band communication channel (e.g., 170) and management controller 152 using the out of band communication channel (e.g., 172).

To provide its functionality, management controller 152 may: (i) obtain a request to update operation of data processing system 140, (ii) based on the request, obtain an update package from a remote source connected to the distributed system, (iii) storing the update package in a dedicated partition limited to usability during boot processes (e.g., startup and/or restart) where updates may be performed before a startup management entity hands off management of the data processing system to an operating system hosted by hardware resources 150, and/or (iv) perform other actions.

To support inbound and outbound traffic, network module 160 may include any number of interfaces 164. Interfaces 164 may be implemented using any number and type of communication devices which may each provide wired and/or wireless communication functionality. For example, interfaces 164 may include a wide area network card, a WiFi card, a wireless local area network card, a wired local area network card, an optical communication card, a radio access network (RAN) card, a wide area network (WAN) card, and/or other types of communication components. These components may support any number of wired/wireless channels 176.

Thus, from the perspective of an external device, the in-band components and out of band components of data processing system 140 may appear to be two independent network entities, that may independently addressable, and otherwise unrelated to one another.

To facilitate management of data processing system 140 over time, hardware resources 150, management controller 152 and/or network module 160 may be positioned in separately controllable power domains. By being positioned in these separate power domains, different subsets of these components may remain powered while other subsets are unpowered.

For example, management controller 152 and network module 160 may remain powered while hardware resources 150 is unpowered. Consequently, management controller 152 may remain able to communication with other devices even while hardware resources 150 are inactive. Similarly, management controller 152 may perform various actions while hardware resources 150 are not powered and/or are otherwise inoperable, unable to cooperatively perform various process, are compromised, and/or are unavailable for other reasons. For example, by remaining powered, management controller 152 and network module 160 may facilitate out of band communications with devices on a network.

To implement the separate power domains, data processing system 140 may include a power source (e.g., 180) that separately supplies power to power rails (e.g., 184, 186) that power the respective power domains. Power from the power source (e.g., a power supply, battery, etc.) may be selectively provided to the separate power rails to selectively power the different power domains. A power manager (e.g., 182) may manage power from power source 180 is supplied to the power rails (e.g., by providing instructions via side band channels 174). Management controller 152 may cooperate with power manager 182 to manage supply of power to these power domains. Management controller 152 may communicate with power manager 182 via side band channels 174 and/or via other means.

In FIG. 1B, an example implementation of separate power domains using power rails 184-186 is shown. The power rails may be implemented using, for example, bus bars or other types of transmission elements capable of distributing electrical power. While not shown, it will be appreciated that the power domains may include various power management components (e.g., fuses, switches, etc.) to facilitate selective distribution of power within the power domains.

Figure 2A:
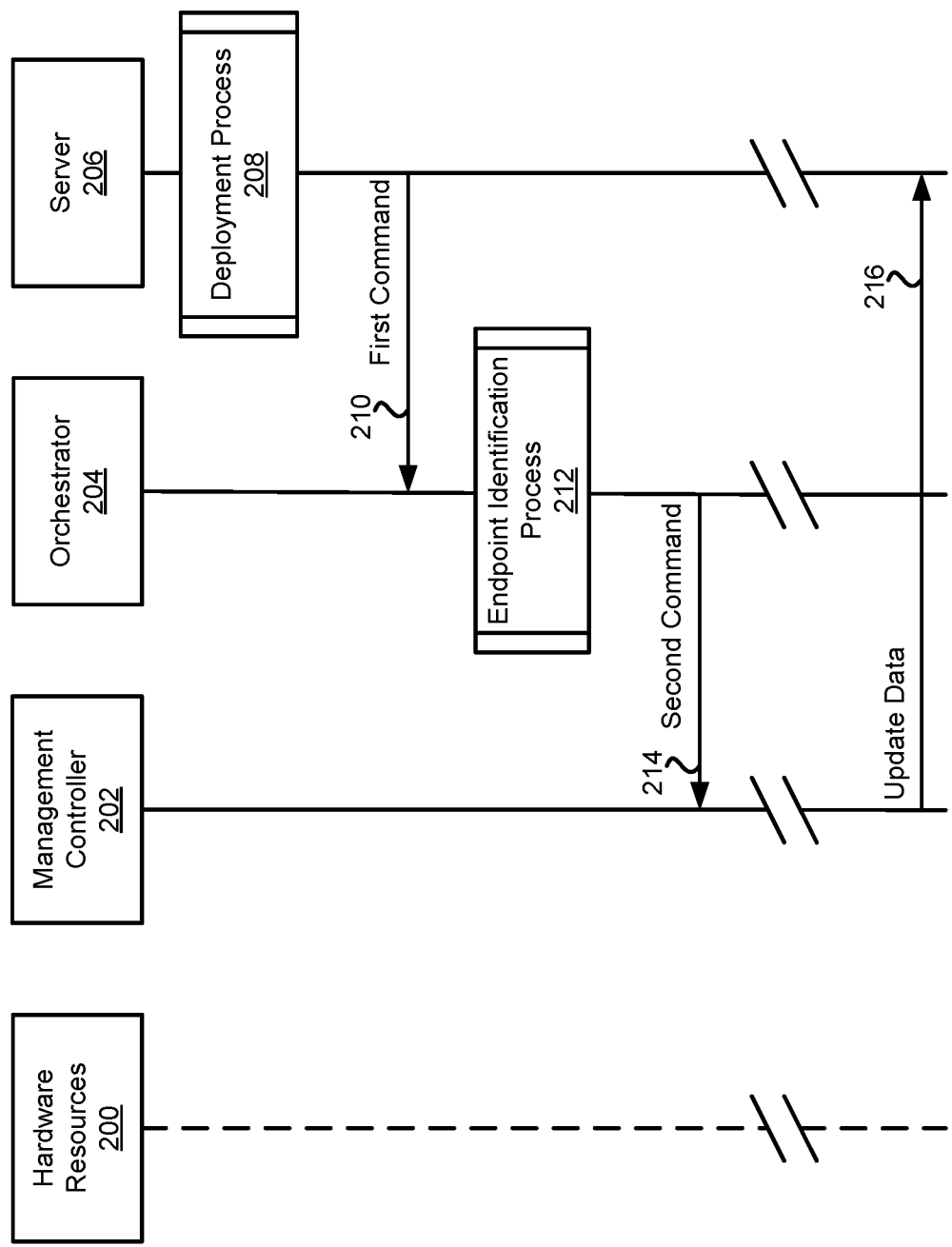
Figure 2B:
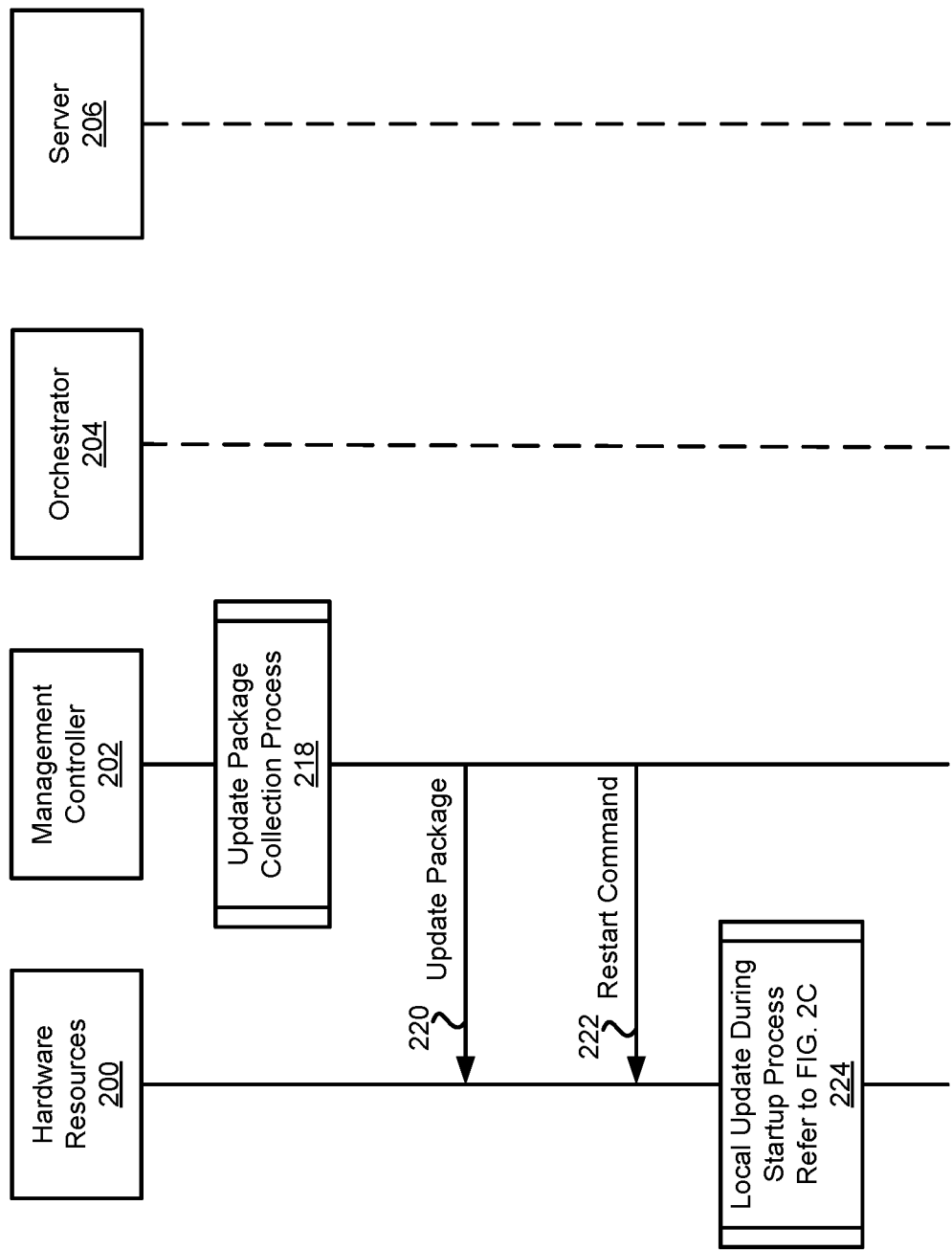
Figure 3:
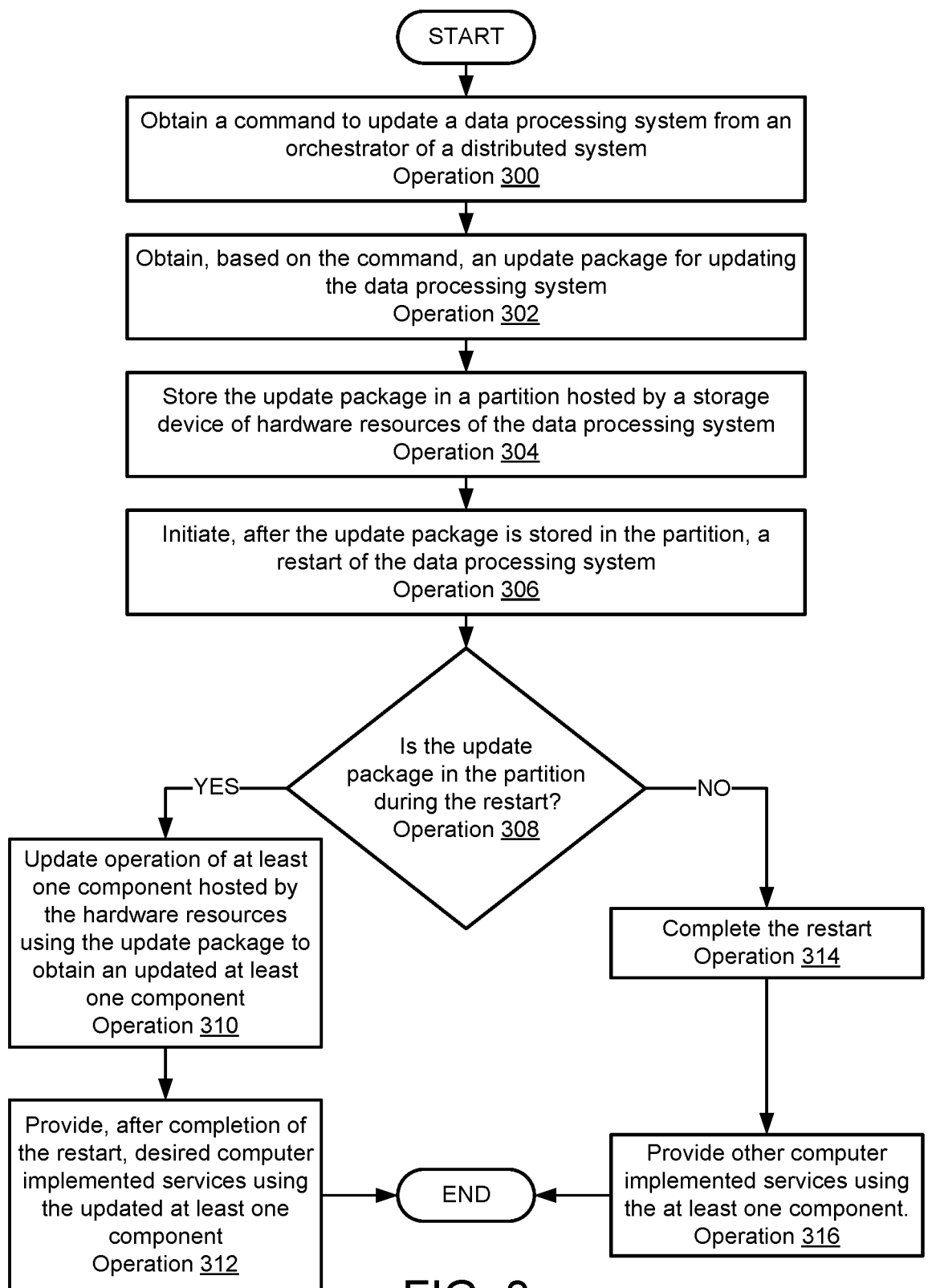
FIG. 3 shows a flow diagram illustrating a method for performing an update on a data processing system in accordance with an embodiment.

When providing its functionality, components of data processing system 140 may perform all, or a portion, of the methods and operations illustrated in FIGS. 2A-3.

While illustrated in FIG. 1B with a limited number of specific components, a system may include additional, fewer, and/or different components without departing from embodiments disclosed herein.

As discussed above, the components of FIGS. 1A-1B may perform various methods to manage updates for a data processing system. FIGS. 2A-3 may illustrate examples of methods that may be performed by the components of FIGS. 1A-1B. For example, a management controller similar to management controller 152 may perform all or a portion of the methods. In the diagrams discussed below and shown in FIGS. 2A-3, any of the operations may be repeated, performed in different orders, and/or performed in parallel with or in a partially overlapping in time manner with other operations.

To further clarify embodiments disclosed herein, interaction diagrams in accordance with an embodiment are shown in FIGS. 2A-2C. These interaction diagrams may illustrate how data may be obtained and used within the system of FIGS. 1A-1B.

In the interaction diagrams, processes performed by, and interactions between, components of a system in accordance with an embodiment are shown. In the diagrams, components of the system are illustrated using a first set of shapes (e.g., hardware resources 200, management controller 202, etc.), located towards the top of each figure. Lines descend from these shapes. Processes performed by the components of the system are illustrated using a second set of shapes (e.g., deployment process 208, etc.) superimposed over these lines. Interactions (e.g., communication, data transmissions, etc.) between the components of the system are illustrated using a third set of shapes (e.g., 210, 214, etc.) that extend between the lines. The third set of shapes may include lines terminating in one or two arrows. Lines terminating in a single arrow may indicate that one-way interactions (e.g., data transmission from a first component to a second component) occur, while lines terminating in two arrows may indicate that multi-way interactions (e.g., data transmission between two components) occur.

Additional processes and/or additional interactions not explicitly shown in the diagrams may be indicated by a gap (e.g., a break) in the lines. The gap may be illustrated with diagonal, parallel lines intersecting an end of a first unbroken portion of a line and a start of a second unbroken portion of the line.

It will be appreciated that although not explicitly shown in a same diagram as the gap (e.g., FIG. 2A), the additional processes and/or the additional interactions may be shown and discussed with regard to another diagram (e.g., FIGS. 2B-2C, discussed further below).

Generally, the processes and interactions are temporally ordered in an example order, with time increasing from the top to the bottom of each page. For example, the process labeled as 208 may occur prior to the interaction labeled as 210. However, it will be appreciated that the processes and interactions may be performed in different orders, any may be omitted, and other processes or interactions may be performed without departing from embodiments disclosed herein.

The lines descending from some of the first set of shapes (e.g., 200, etc.) is drawn in dashing to indicate, for example, that the corresponding components may not be (i) operable, (ii) powered on, (iii) present in the system, and/or (iv) not participating in operation of the system for other reasons.

Turning to FIG. 2A, a first interaction diagram in accordance with an embodiment is shown. The first interaction diagram may illustrate processes and interactions that may occur during an update of a data processing system.

To update the data processing system, an update package may be made available on a network of devices (e.g., the system of FIG. 1A). For example, the update may be made at least partially available on the network using server 206 to host the update package. To do so, deployment process 208 may be performed.

During deployment process 208, one or more portions of executable computer code may be obtained and may also be compiled to obtain an update package. This update package may be usable to update the data processing system. For example, when executed, this compilation of the one or more portions of executable computer code may update (e.g., modify) operation of hardware resources (e.g., 200) of the data processing system, thereby updating the data processing system.

To obtain and compile the one or more portions of the executable computer code, a device capable of connecting to the network, such as user device 106, discussed with regard to FIG. 1A, may be used (not shown). For example, user device 106 may be a physical device used by a developer and/or other entity to write at least a portion of the one or more portions using a programming language (e.g., java, C++, python, etc.), outsource at least a portion of the one or more portions from another developer and/or different entity, and/or otherwise perform other processes through which at least a portion of the one or more portions is obtained.

Once obtained, the one or more portions of executable computer code may be compiled to obtain the update package, as mentioned previously. This compilation may increase an efficiency associated with transmission of the one or more portions across the network and/or execution of the one or more portions by devices connected to the network.

However, for the update package to be accessible within the network, the update package may be deployed to a device accessible across the network. For example, the update package may be deployed to server 206 (e.g., server 100, discussed with regard to FIG. 1A), thereby making the update package available on the network (e.g., to devices on the network).

To deploy the update package to server 206, the update package may be stored (e.g., using user device 106) in physical storage of server 206 at, for example, a physical address of a storage device that corresponds with a digital address (e.g., associated with server 206) within the network. For example, by being stored at the physical address, devices connected to the network may locate the update package using the corresponding digital address.

Thus, by obtaining and deploying the update package such that the update package may be made available across the network, (and therefore, available to a device connected to the network), deployment process 208 may be performed.

At interaction 210, a first command may be generated and provided to orchestrator 204 by server 206 (and/or another device connected to the network) based on a new availability of the update package caused by deployment process 208. For example, the first command may be generated to (i) indicate performance of deployment process 208 and (ii) specify that the update be performed for specific hardware resources (e.g., at least one component of hardware resources 200) of the data processing system.

The first command may be provided to orchestrator 204 via (i) transmission via a message, (ii) storing in a storage with subsequent retrieval by orchestrator 204, (iii) via a publish-subscribe system where orchestrator 204 subscribes to updates from server 206 (e.g., and/or user device 106), thereby causing a copy of the update package (e.g., and instructions regarding the update) and/or information regarding the specific hardware resources, to be propagated to orchestrator 204, and/or (iv) via other processes.

By providing the first command to orchestrator 204, orchestrator 204 may be prompted to communicate with the data processing system to facilitate the update for the specified hardware resources. Additionally, for example, orchestrator 204 may be prompted to communicate based on information included in the first command and/or information from, for example, user device 106 (e.g., the developer) regarding instructions for facilitating the update.

To communicate with the data processing system, orchestrator 204 may identify a number of network endpoints of the data processing system that may be used to communicate with specific components (e.g., the hardware resources) of the data processing system. For example, one of the network endpoints (e.g., a first network endpoint) may be used as a first access point for communication with a management controller (e.g., 202) of the data processing system, the first access point directing the communication through an out of band communication channel.

Additionally, for example, a second network endpoint of the data processing system may be used as a second access point for communication with the hardware resources (e.g., 200), the second access point directing the communication through an in-band communication channel.

To identify the number of network endpoints, endpoint identification process 212 may be performed (e.g., by orchestrator 204).

During endpoint identification process 212, a first address corresponding to, for example, the first network endpoint for communication with the management controller (e.g., 202) may be obtained. Additionally, a second (and/or third, fourth, fifth, etc.) address corresponding to, for example, the second network endpoint for communication with the hardware resources (e.g., 200) may be obtained. This first and/or second address may be obtained based on interaction 210 (e.g., information transmitted during interaction 210), the information regarding instructions for facilitating the update, and/or information advertised by a network module of the data processing system, as discussed with regard to FIG. 1B.

By identifying these network endpoints of the data processing system, orchestrator 204 may be able to communicate directly with (e.g., using the network module) management controller 202 without relying on communication between orchestrator 204 and hardware resources 200. For example, if hardware resources 200 was compromised (e.g., was infected with a computer virus, depended on corrupted computer code to operate, and/or was otherwise in a state not conducive to providing computer implemented services as intended), communication between hardware resources 200 and orchestrator 204 using an in-band communication channel may increase a likelihood of compromise of other devices connected to the network and/or decrease a likelihood of successfully updating the data processing system. Therefore, by using the out of band communication channel to communicate with management controller 202, the likelihood of compromise of the other devices (and/or the data being transmitted between devices) connected to the network may be decreased and/or the likelihood of successfully updating the data processing system may be increased.

At interaction 214, a second command may be generated and provided to management controller 202 by orchestrator 204 using, for example, the first address to direct transmission of the second command through the out of band communication channel. By using the first address to direct communication transmissions to management controller 202, the second command may be provided to the network module (the network module differentiating between the first address and the second address before relaying the transmissions to management controller 202 via the out of band communication channel).

Similar to the first command, the second command may be provided via (i) transmission via a message, (ii) storing in a storage with subsequent retrieval by management controller 202, and/or (iii) via other processes.

This second command may also be similar to the first command by (i) indicating performance of deployment process 208 (and therefore, indicate the new availability of the update package), (ii) specifying that the update be performed for the specific hardware resources (corresponding to the second address), and/or (iii) otherwise providing relevant update information.

By providing the second command to management controller 202, management controller 202 may be prompted to perform the update for the data processing system to update operation of hardware resources 200.

Management controller 202 may perform processes to manage the update. These processes may occur during the gap following interaction 214. For example, to manage the update, management controller 202 may (i) obtain the update package via the out of band communication channel, (ii) store (via a side band communication channel, discussed with regard to FIG. 1B, to decrease the likelihood of compromise of the devices connected to the network) the update package in a dedicated partition hosted by a storage device of hardware resources 200, and after the update package is stored, (iii) initiate a restart of the data processing system, the update being performed during the restart to obtain an updated data processing system upon completion of the restart.

It will be appreciated that although not explicitly shown in FIG. 2A, additional processes and/or additional interactions associated with managing the update may occur within the gap (e.g., the break) following interaction 214, as depicted in FIG. 2A. For additional information regarding the additional processes and/or the additional interactions that may occur, refer to FIGS. 2B-2C discussed further below.

At interaction 216, update data may be provided by management controller 202 based on completion of the update. This update data may be provided to orchestrator 204, server 206, and/or a different entity responsible for storing update records of the data processing system. For example, if the update data indicates that the update may not be completed (e.g., at least not correctly/successfully), server 206 may send additional commands similar to the first command to perform additional iterations of the update. Alternatively, if the update data indicates that the update completed successfully, server 206 may not send additional commands. To do so, for example, management controller 202 (e.g., 152) may facilitate communication with the network module using the out of band communication as previously discussed.

As noted above and although not explicitly shown in the same diagram as the gap (e.g., FIG. 2A), the additional processes and/or the additional interactions may be shown and discussed with regard to another diagram. For example, for additional information regarding performance of the update, refer FIGS. 2B-2C below.

Turning to FIG. 2B, a second interaction diagram in accordance with an embodiment is shown. The second interaction diagram may illustrate second example processes and interactions that may occur during the gap shown in FIG. 2A.

As previously mentioned with regard to interaction 214 in FIG. 2A, management controller 202 may be prompted to perform the update for the data processing system based on the second command. To perform the update, management controller 202 may obtain the update package and store the update package in the partition mentioned with regard to FIG. 2A. To obtain the update package, update package collection process 218 may be performed.

During update package collection process 218, management controller 202 may identify a third address at which the update package is stored (e.g., the digital address corresponding with the physical address of a storage device in the physical storage of server 206, discussed with regard to FIG. 2A and the digital address being accessible while connected to the network.)

Management controller 202 may identify the third address based on information included in the second command, by requesting the third address from devices connected to the network (e.g., orchestrator 204 and/or server 206), and/or by some other processes resulting in identification of the third address.

Once identified, the third address may be used by management controller 202 to obtain the update package (e.g., and any information regarding the update package). Thus, update package collection process 218 may be performed to obtain the update package. The update package may be obtained, for example, via an interaction with server 206 (not shown).

At interaction 220, the update package may be stored in the partition hosted by the storage device of hardware resources 200, discussed with regard to FIG. 2A. To store the update package in the partition, a fourth address for a digital location in the partition may be identified and the update package may be stored in a physical address of the storage device corresponding with the fourth address. Additionally, it will be appreciated that the fourth address may be associated with (e.g., and may only be used for, and read during) boot processes performed by the data processing system.

To facilitate interaction 220, a side band communication channel may be used between the management controller and the storage device.

At interaction 222, a restart of the data processing system may be initiated by management controller 202. To do so, management controller 202 may provide a restart command to hardware resources 200. The restart command may be provided in a manner similar to the first command, the second command, and/or other transmissions within the network and discussed herein. For example, management controller 202 may use a second side band communication channel to provide the restart command to a processor of the data processing system. Based on the restart command, the processor may implement a restart (e.g., and/or a shutdown process followed by a boot process) and in doing so, may cause hardware resources 200 to perform local update during startup process 224.

During local update during startup process 224, hardware resources 200 (e.g., the processor) may handoff management of the data processing system to a startup management entity, thereby causing the restart to be performed.

During the restart, the startup management entity may determine (i) whether any update package is stored in the partition, and (ii) if at least one update package is stored in the partition, update operation of at least one component of hardware resources 200 using the update package to obtain an updated at least one component (and thus, obtain an updated data processing system).

Based on completion of the restart (assuming the update was successful), hardware resources 200 may facilitate various functionalities using the updated at least one component, thereby allowing the (updated) data processing system to provide the computer implemented services.

For additional information regarding local update during startup process 224, refer to FIG. 2C, discussed further below.

Turning to FIG. 2C, a third interaction diagram in accordance with an embodiment is shown. The third interaction diagram may illustrate third example processes and interactions that may occur during local update during startup process 224 shown in FIG. 2B.

As previously discussed with regard to FIG. 2B, management controller 202 may store the update package in the partition hosted by the storage device of hardware resources 200. Once management controller 202 has stored the update package in the partition, a restart command may be provided (e.g., from management controller 202) to, for example, a processor of hardware resources 200 to initiate a restart of the data processing system.

Although accessible by management controller 202 to store the update package outside of a boot process, it will be appreciated that utilization of the partition may otherwise be restricted to boot processes of the data processing system (e.g., limited to being used during the restart and/or during other boot processes of the data processing system).

Based on the restart request, reboot initiation process 226 may be performed to initiate the restart.

During reboot initiation process 226, a hardware component of hardware resources 200, such as a processor of the data processing system, may hand off management of the data processing system to a startup management entity hosted by the hardware resources. This handoff may thereby place the data processing system in a boot process. Additionally, handoff to the startup management entity may prevent active communication with devices connected to the distributed system that may otherwise provide a vulnerability that compromises the successful installation of the update.

As part of the restart (e.g., and/or a boot process), the dedicated partition may be checked for a presence of the update package (and/or any update package). To do so, update data checking process 228 may be performed.

During update data checking process 228, a range of digital addresses, corresponding with a range of physical addresses on the storage device in which the partition may be stored, may be identified. The identified range of digital addresses may then be checked for a presence of any update package. If determined that the update package (and/or any update package) is stored in the dedicated partition, the startup management entity may determine where the update package is stored in the dedicated partition. For example, the update package may be stored in a physical address corresponding with the fourth address discussed with regard to interaction 220 in FIG. 2B.

Once presence of the update package is identified in the dedicated partition, the update package may be used to perform the update. To do so, installation process 230 may be performed.

During installation process 230, the startup management entity may obtain (e.g., read from memory) the update package from the fourth address as previously identified. The startup management entity may then (i) update operation of at least one component hosted by the hardware resources using the update package to obtain an updated at least one component (and thereby updating the data processing system), and (ii) complete the restart.

By doing so, computer code on which functionalities facilitated by the at least one component depend may be modified based on the update package. By modifying this computer code, an operation of the at least one component (and thus, the data processing system) may be modified. Therefore, by modifying the operation of the at least one component, a quantity and/or type of the computer implemented services provided by the at least one component may also be modified.

Any of the processes illustrated using the second set of shapes and interactions illustrated using the third set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes and interactions illustrated using the third set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor-based devices (e.g., computer chips).

Any of the processes and interactions may be implemented using any type and number of data structures. The data structures may be implemented using, for example, tables, lists, linked lists, unstructured data, data bases, and/or other types of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

Thus, via processes and interactions shown in FIGS. 2A-2C, management controller 202 may manage one or more updates (e.g., out of band software updates) for the data processing system (e.g., 140) by managing collection and/or storage of available update packages on which the one or more updates depend. Management controller 202 may also be recognized as an uncompromised entity (regardless of possible compromise of hardware resources of data processing system 140) by orchestrator 204, server 206, and/or any other entities connected to the network and may proceed to interact with orchestrator 204, server 206, and/or the any other entities to manage updates of data processing system 140 using the out of band communication channel.

As discussed above, the components of FIGS. 1A-2C may perform various methods to manage data processing systems (e.g., updating a data processing system). FIG. 3 illustrates methods that may be performed by the components of FIGS. 1A-2C. In the diagram discussed below and shown in FIG. 3, any of the operations may be repeated, performed in different orders, and/or performed in parallel with or in a partially overlapping in time manner with other operations.

Turning to FIG. 3, a flow diagram illustrating a method for updating a data processing system in accordance with an embodiment is shown. The method may be performed, for example, by a management controller of the data processing system, and/or any other entity.

At operation 300, a command to update a data processing system from an orchestrator of a distributed system is obtained. The command may be obtained via an out of band communication channel, the out of band communication channel providing a means for communication between the management controller and other entities in the distributed system. For example, the management controller may host a transmission control protocol/internet protocol (TCP/IP) stack to facilitate network communications via the out of band communication channel.

To provide the means for this communication, the out of band communication channel may run through a network module of the data processing system, as discussed with respect to FIG. 1B. In doing so, the network module may advertise network endpoints for the management controller. These network endpoints may thereby be discriminated from network endpoints for communication with hardware resources of the data processing system, this communication between the hardware resources and the other entities in the distributed system being facilitated by in-band communication channels. Thus, the advertised network endpoints may be usable by the storage resources to address communications to the hardware resources and the management controller, separately, thereby allowing the command from the orchestrator to be relayed by the network module to the management controller.

The command may include information indicative of an available update for the data processing system, the command requesting for installation of a package of code (e.g., an update package, previously discussed). Additionally, the command may further include information indicative of where to obtain the update package (e.g., within the distributed system).

At operation 302, an update package for updating the data processing system is obtained based on the command. The update package may be obtained by identifying a location (e.g., a digital address within the distributed system) where the update package may be stored. To do so, for example, the command may be read and/or analyzed to obtain the location, assuming the command is indicative of the location. Additionally, a request may be provided to other devices within the distributed system to identify where the available update is made accessible to the distributed system (e.g., the identification being based on replies to the request).

Once identified, the location may be used to obtain the update package via the out of band communication, as mentioned above. Obtaining the update package may include: (i) providing a request for the update package to an entity associated with the location where the update package may be stored, (ii) receiving, as a transmission over the out of band communication channel, the update package from the entity, and/or (iii) other methods.

At operation 304, the update package is stored in a partition hosted by a storage device of the hardware resources of the data processing system. The update package may be stored in the partition via a first side band communication channel used by the management controller, the management controller having access to any number of side band communication channels as discussed with respect to FIG. 1B. These side band communication channels may each facilitate communication from the management controller and to a hardware resource of the hardware resources. Additionally, by being hosted by the storage device, the partition may be implemented by a portion of storage resources (e.g., a range of storage provided by the storage device), and the update package may be stored within the range of storage once obtained by the storage device. Therefore, storing the update package may include providing the update package to the hardware resources via the first side band communication channel and/or providing instructions to the hardware resources indicating that the update package is to be stored in the partition.

By using the first side band communication channel (and/or any of the side band communication channels), the management controller may provide data (e.g., the update package) and/or commands (e.g., to use the data) to the hardware resources without risk of existing compromise of the hardware resources affecting the management controller and/or the other devices.

At operation 306, a restart of the data processing system is initiated after the update package is stored in the partition. The restart may be initiated by sending a request to perform the restart. For example, the management controller may use a second side band communication channel to provide a second command to a processor of the data processing system, the second command indicating the processor may leverage its functionalities to perform the restart. Initiating the restart may also include: (i) performing at least a portion of the restart by instructing one or more hardware components to become depowered, to wipe contents of random access memory (RAM), etc., (ii) providing the request to perform the restart to another startup management entity responsible for managing restart processes for the data processing system (e.g., a software agent), and/or (iii) other methods.

Although described with regard to a restart of the data processing system, it will be appreciated that a shutdown of the data processing system followed by a startup of the data processing system may result in performance of operations 308-316, discussed below.

At operation 308, a determination is made during the restart regarding whether any update package is stored in the partition. The determination may be made by: (i) checking data (e.g., reading contents) stored in the range of storage corresponding with the partition from the storage device included in the hardware resources, (ii) performing a search process using a keyword (e.g., an identifier for the update package) and the contents of the range of storage to identify if any update packages are stored in the partition, (iii) if at least one update package is identified, determining that the update package is stored in the partition (the range of storage).

Determining whether any update package is stored in the partition may also include providing search instructions to another entity (e.g., a software application) responsible for searching the contents of the partition and receiving, in response to the provided search instructions, a report indicating whether the update package is stored in the partition. If determined that the update package is stored in the partition, then the method may proceed to operation 310. Otherwise, the method may proceed to operation 314.

At operation 310, operation of at least one component hosted by the hardware resources is updated using the update package to obtain an updated at least one component. The operation may be updated by modifying (e.g., replacing) executable code on which the operation depends, the executable code being included in the update package. By modifying the executable computer code on which the operation depends, various functionalities of the at least one component may be performed in alternate manners, cause alternate outcomes, and/or cause other effects not caused (and/or caused in a different manner) prior to the modification.

It will be appreciated that after performance of operation 310, various processes not explicitly discussed herein may also be performed. For example, such processes may occur as a part of various boot processes.

Additionally, it will be appreciated that such processes may be performed until completion of the restart. Furthermore, completion of the restart may result in management of the data processing system being handed to, for example, an operating system hosted by the data processing system (e.g., from the startup management entity).

At operation 312, and after completion of the restart, desired computer implemented services are provided using the updated at least one component. The desired computer implemented services may be provided by utilizing the at least one component during operation of the data processing system. For example, when using a software associated with the at least one component (e.g., uses the at least one component to provide services), the software may facilitate execution of the executable computer code included in the update package that replaced the prior code on which the operation depended, mentioned above.

The method may end following operation 312.

Returning to operation 308, the method may proceed to operation 314 if the update package is not in the partition during restart.

At operation 314, the restart is completed. The restart may be completed by the startup management entity performing a handoff of management of the data processing system to, for example, an operating system of the data processing system.

At operation 316, other computer implemented services are provided using the at least one component. The other computer implemented services may be provided by, for example, the operating system facilitating performance of one or more software components. These software components may facilitate execution of various portions of computer code, thereby causing various hardware resources, such as the at least one component, to provide functionalities on which the various portions of the computer code depend.

The method may end following operation 316.

Thus, using the method illustrated in FIG. 3, embodiments disclosed herein may update data processing systems even while relying on out of band communications. For example, by relying on out of band communication during update of a data processing system included in a distributed system, a likelihood of other entities included in the distributed system experiencing undesired effects caused by compromise of the data processing system may decrease. By doing so, security of systems may be improved (e.g., data processing systems within a same distributed system may be prevented from compromising one another).

Figure 4:
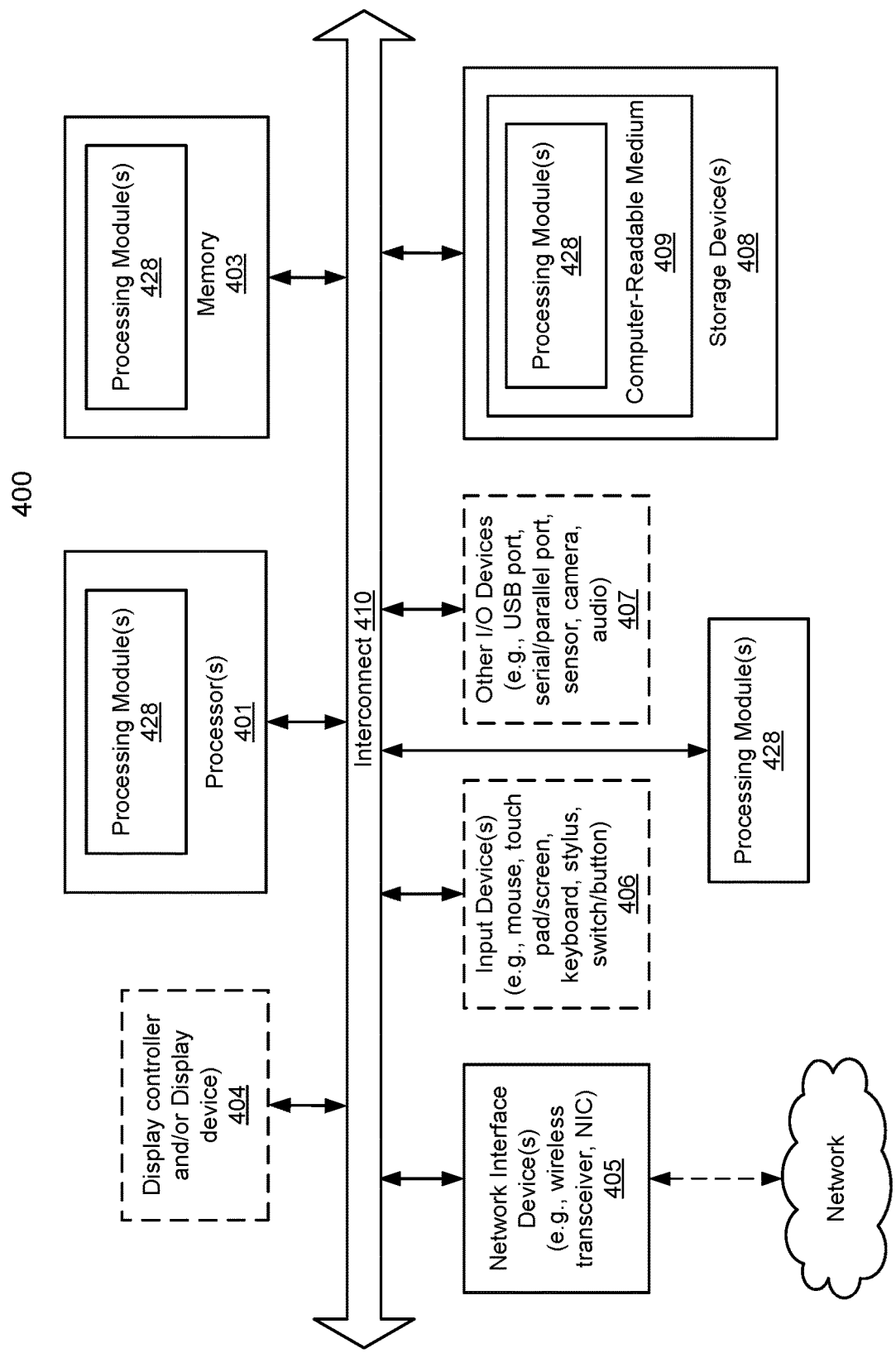
FIG. 4 shows a block diagram illustrating a data processing system in accordance with an embodiment.

Any of the components illustrated and/or discussed in FIGS. 1A-3 may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random-access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a Wi-Fi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid-state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also, a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs, or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components, or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for updating a data processing system of a distributed system, the method comprising:

obtaining, by a management controller of the data processing system, a command to update the data processing system from an orchestrator of the distributed system;

obtaining, by the data processing system and based on the command, an update package for updating the data processing system, the update package being obtained from a remote entity of the distributed system;

storing, by the management controller, the update package in a partition hosted by a storage device of hardware resources of the data processing system;

initiating, by the management controller and after the update package is stored in the partition, a restart of the data processing system; and during the restart:
    making, by a startup management entity hosted by the hardware resources, a determination regarding whether any update package is stored in the partition;
    in a first instance of the determination where the update package is stored in the partition:
        updating, by the startup management entity, operation of at least one component hosted by the hardware resources using the update package to obtain an updated at least one component; and
        providing, by the hardware resources and after completion of the restart, desired computer implemented services using the updated at least one component.

2. The method of claim 1, further comprising:
in a second instance of the determination where no update package is in the partition:
    completing, by the startup management entity, the restart; and
    providing, by the hardware resources, other computer implemented services using the at least one component.

3. The method of claim 1, wherein the command indicates that the management controller is to install the update package.

4. The method of claim 3, wherein the update package comprises executable computer code that when executed updates the at least one component to obtain the updated at least one component.

5. The method of claim 4, wherein the partition comprises a portion of storage resources of the hardware resources.

6. The method of claim 5, wherein storing the update package comprises sending, over a side band communication channel and by the management controller, the update package to at least one storage device of the storage resources that supports the partition.

7. The method of claim 1, wherein initiating the restart comprises sending, by the management controller and via a side band communication channel, a request to perform the restart.

8. The method of claim 1, wherein the data processing system comprises a network module adapted to separately advertise network endpoints for the management controller and the hardware resources, the network endpoints being usable by storage resources to address communications to the hardware resources and the management controller.

9. The method of claim 8, wherein the management controller and the network module are on separate power domains from the hardware resources so that the management controller and the network module are operable while the hardware resources are inoperable.

10. The method of claim 8, wherein an out of band communication channel runs through the network module, and an in-band communication channel that services the hardware resources also runs through the network module.

11. The method of claim 10, wherein the management controller hosts a transmission control protocol/internet protocol (TCP/IP) stack to facilitate network communications via the out of band communication channel.

12. A non-transitory machine-readable medium having instructions stored therein, which when executed by a processor, cause the processor to perform operations for updating a data processing system of a distributed system, the operations comprising:

obtaining, by a management controller of the data processing system, a command to update the data processing system from an orchestrator of the distributed system;

obtaining, by the data processing system and based on the command, an update package for updating the data processing system, the update package being obtained from a remote entity of the distributed system;

storing, by the management controller, the update package in a partition hosted by a storage device of hardware resources of the data processing system;

initiating, by the management controller and after the update package is stored in the partition, a restart of the data processing system; and during the restart:
    making, by a startup management entity hosted by the hardware resources, a determination regarding whether any update package is stored in the partition;
    in a first instance of the determination where the update package is stored in the partition:
        updating, by the startup management entity, operation of at least one component hosted by the hardware resources using the update package to obtain an updated at least one component; and
        providing, by the hardware resources and after completion of the restart, desired computer implemented services using the updated at least one component.

13. The non-transitory machine-readable medium of claim 12, wherein the operations further comprise:
in a second instance of the determination where no update package is in the partition:
    completing, by the startup management entity, the restart; and
    providing, by the hardware resources, other computer implemented services using the at least one component.

14. The non-transitory machine-readable medium of claim 12, wherein the partition comprises a portion of storage resources of the hardware resources.

15. The non-transitory machine-readable medium of claim 14, wherein storing the update package comprises sending, over a side band communication channel and by the management controller, the update package to at least one storage device of the storage resources that supports the partition.

16. The non-transitory machine-readable medium of claim 12, wherein initiating the restart comprises sending, by the management controller and via a side band communication channel, a request to perform the restart.

17. A data processing system, comprising:
a processor; and
a memory coupled to the processor to store instructions, which when executed by the processor, cause the processor to perform operations for updating a data processing system of a distributed system, the operations comprising:

obtaining, by a management controller of the data processing system, a command to update the data processing system from an orchestrator of the distributed system;

obtaining, by the data processing system and based on the command, an update package for updating the data processing system, the update package being obtained from a remote entity of the distributed system;

storing, by the management controller, the update package in a partition hosted by a storage device of hardware resources of the data processing system;

initiating, by the management controller and after the update package is stored in the partition, a restart of the data processing system; and during the restart:
  making, by a startup management entity hosted by the hardware resources, a determination regarding whether any update package is stored in the partition;
  in a first instance of the determination where the update package is stored in the partition:
    updating, by the startup management entity, operation of at least one component hosted by the hardware resources using the update package to obtain an updated at least one component; and
    providing, by the hardware resources and after completion of the restart, desired computer implemented services using the updated at least one component.

18. The data processing system of claim 17, wherein the operations further comprise:
  in a second instance of the determination where no update package is in the partition:
    completing, by the startup management entity, the restart; and
    providing, by the hardware resources, other computer implemented services using the at least one component.

19. The data processing system of claim 17, wherein the partition comprises a portion of storage resources of the hardware resources.

20. The data processing system of claim 19, wherein storing the update package comprises sending, over a side band communication channel and by the management controller, the update package to at least one storage device of the storage resources that supports the partition.

* * * * *